US009652070B2

(12) United States Patent
Hagenbuch et al.

(10) Patent No.: US 9,652,070 B2
(45) Date of Patent: May 16, 2017

(54) INTEGRATING MULTIPLE DIFFERENT TOUCH BASED INPUTS

(71) Applicant: LENOVO (Singapore) PTE, LTD., New Tech Park (SG)

(72) Inventors: Matthew Lloyd Hagenbuch, Durham, NC (US); Howard Locker, Cary, NC (US); John Weldon Nicholson, Cary, NC (US); Matthew Price Roper, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 174 days.

(21) Appl. No.: 14/036,874

(22) Filed: Sep. 25, 2013

(65) Prior Publication Data

US 2015/0084873 A1  Mar. 26, 2015

(51) Int. Cl.
*G06F 3/041* (2006.01)
*G06F 3/042* (2006.01)
*G06F 3/043* (2006.01)
*G06F 3/044* (2006.01)
*G06F 3/045* (2006.01)
*G06F 3/046* (2006.01)

(52) U.S. Cl.
CPC ............ *G06F 3/0416* (2013.01); *G06F 3/042* (2013.01); *G06F 3/043* (2013.01); *G06F 3/044* (2013.01); *G06F 3/045* (2013.01); *G06F 3/046* (2013.01); *G06F 2203/04105* (2013.01); *G06F 2203/04106* (2013.01)

(58) Field of Classification Search
CPC .......... G06F 3/041; G06F 2203/04105; G06F 2203/04106; G06F 3/0416; G06F 3/042; G06F 3/043; G06F 3/044; G06F 3/045; G06F 3/046
USPC ......................................... 345/178, 170–174
See application file for complete search history.

(56) References Cited

U.S. PATENT DOCUMENTS

| 4,954,817 | A | * | 9/1990 | Levine | G06F 3/014 345/156 |
| 5,231,381 | A | * | 7/1993 | Duwaer | G06F 3/016 178/18.03 |
| 5,402,151 | A | * | 3/1995 | Duwaer | G06F 3/044 178/18.05 |
| 5,670,755 | A | * | 9/1997 | Kwon | G06F 3/045 178/18.05 |
| 5,706,026 | A | * | 1/1998 | Kent | G06F 3/0312 345/156 |
| 5,790,106 | A | * | 8/1998 | Hirano et al. | 345/173 |
| 5,999,166 | A | * | 12/1999 | Rangan | G06F 3/0354 345/157 |
| 6,118,435 | A | * | 9/2000 | Fujita | G06F 3/016 345/173 |

(Continued)

FOREIGN PATENT DOCUMENTS

WO  WO 2013061499 A1 *  5/2013

*Primary Examiner* — Tony Davis
(74) *Attorney, Agent, or Firm* — Kunzler Law Group

(57) ABSTRACT

For integrating multiple different touch based inputs, a method is disclosed that includes detecting a pressure at a screen pressure module, enabling a first touch module based on the pressure exceeding a pressure threshold value, and integrating input from a second touch module and the first touch module, the input from the first touch module and the second touch module being concurrently received.

20 Claims, 10 Drawing Sheets

(56) References Cited

U.S. PATENT DOCUMENTS

| | | | | |
|---|---|---|---|---|
| 7,436,393 B2* | 10/2008 | Hong | G06F 3/045 | 178/18.01 |
| 8,982,045 B2* | 3/2015 | Hinckley | G06F 1/1649 | 345/156 |
| 9,019,188 B2* | 4/2015 | Han | G09G 3/20 | 345/99 |
| 2001/0008550 A1* | 7/2001 | Takahashi | H04J 3/0608 | 375/368 |
| 2002/0056009 A1* | 5/2002 | Affif | G06F 9/4443 | 709/246 |
| 2002/0186198 A1* | 12/2002 | Coghan, IV | G06F 3/014 | 345/156 |
| 2003/0025670 A1* | 2/2003 | Barnett | G04G 21/00 | 345/157 |
| 2003/0098858 A1* | 5/2003 | Perski | G06F 3/0416 | 345/173 |
| 2004/0097265 A1* | 5/2004 | Cadieux | G06F 1/3203 | 455/557 |
| 2004/0105040 A1* | 6/2004 | Oh | G02F 1/13338 | 349/12 |
| 2006/0012581 A1* | 1/2006 | Haim et al. | | 345/173 |
| 2006/0022636 A1* | 2/2006 | Xian | G06F 3/03543 | 320/108 |
| 2006/0033710 A1* | 2/2006 | Bajramovic | G06F 1/163 | 345/156 |
| 2006/0079276 A1* | 4/2006 | Indik | G06F 3/03543 | 455/556.1 |
| 2006/0279548 A1* | 12/2006 | Geaghan | G06F 3/0416 | 345/173 |
| 2011/0037624 A1* | 2/2011 | Pance | G06F 3/044 | 341/33 |
| 2011/0069022 A1* | 3/2011 | Yokota | G06F 3/0416 | 345/173 |
| 2011/0141052 A1* | 6/2011 | Bernstein et al. | | 345/174 |
| 2011/0216032 A1* | 9/2011 | Oda | G06F 3/044 | 345/174 |
| 2011/0227872 A1* | 9/2011 | Huska | G06F 3/016 | 345/174 |
| 2011/0228117 A1* | 9/2011 | Inoue | G06K 9/00228 | 348/222.1 |
| 2012/0050180 A1* | 3/2012 | King | G06F 3/0416 | 345/173 |
| 2012/0105362 A1* | 5/2012 | Kremin | G06F 3/03545 | 345/174 |
| 2012/0218210 A1* | 8/2012 | DeCaro | G06F 3/044 | 345/173 |
| 2012/0262407 A1* | 10/2012 | Hinckley | G06F 3/038 | 345/173 |
| 2012/0306766 A1* | 12/2012 | Moore | G06F 3/04883 | 345/173 |
| 2013/0009907 A1* | 1/2013 | Rosenberg | G06F 3/046 | 345/174 |
| 2013/0057763 A1* | 3/2013 | Cha | G09G 5/006 | 348/554 |
| 2013/0063167 A1* | 3/2013 | Jonsson | | 324/686 |
| 2013/0063389 A1* | 3/2013 | Moore | G06F 3/04883 | 345/174 |
| 2013/0088434 A1* | 4/2013 | Masuda | G06F 1/3262 | 345/173 |
| 2013/0106774 A1* | 5/2013 | Radivojevic et al. | | 345/174 |
| 2013/0194243 A1* | 8/2013 | Um | G09G 5/393 | 345/204 |
| 2013/0215087 A1* | 8/2013 | Park | G06F 3/0418 | 345/178 |
| 2013/0271431 A1* | 10/2013 | Besperstov | G06F 3/033 | 345/179 |
| 2013/0278585 A1* | 10/2013 | Moon | G09G 3/36 | 345/212 |
| 2013/0317393 A1* | 11/2013 | Weiss | G06F 19/3406 | 600/587 |
| 2013/0321351 A1* | 12/2013 | Paul | G06F 3/0317 | 345/179 |
| 2013/0328828 A1* | 12/2013 | Tate | G06F 3/044 | 345/174 |
| 2014/0125615 A1* | 5/2014 | Sato | G06F 3/0488 | 345/173 |
| 2014/0267052 A1* | 9/2014 | Chow | G06F 3/038 | 345/168 |
| 2014/0267078 A1* | 9/2014 | Kukulski | G06F 3/0416 | 345/173 |
| 2014/0267180 A1* | 9/2014 | Buelow | G06F 3/044 | 345/179 |
| 2014/0300571 A1* | 10/2014 | Tomizu et al. | | 345/173 |
| 2014/0375624 A1* | 12/2014 | Kanoh | G09G 5/18 | 345/213 |
| 2015/0049049 A1* | 2/2015 | Kim | G06F 3/03545 | 345/174 |
| 2015/0170727 A1* | 6/2015 | Shen | G11C 11/1673 | 365/158 |

* cited by examiner

INTEGRATING MULTIPLE DIFFERENT TOUCH BASED INPUTS

FIELD

The subject matter disclosed herein relates to using a touch interface and more particularly relates to integrating multiple different touch based inputs.

BACKGROUND

Description of the Related Art

In general, computing device may be configured with a touch based input capability. A computing device with a touch based interface, or input system, may allow a user to communicate with the computing device. Through a touch interface, a user may change settings, execute programs, respond to notifications, or operate the computing device in another way. As the accuracy and sensitivity of touch based technologies increases, more computing devices may offer a touch based interface.

Some computing devices incorporate multiple touch interfaces. For example, a computing device may include a magnetic resonance touch interface using a pen, with a capacitive touch interface. When a user is using the pen for the magnetic resonance touch interface, a user may inadvertently touch the screen with a wrist or palm. This inadvertent touch may activate other features or cause the computing device to behave unexpectedly. In order to address this issue, computing devices with multiple touch interfaces typically disable one or another touch interface, depending on the current activity of a user.

BRIEF SUMMARY

An apparatus for integrating multiple touch based inputs is disclosed. A method and computer program product also perform the functions of the apparatus. In one embodiment, an apparatus includes a processor, a screen, and a first touch module configured to detect, at the screen, a touch based on a first touch sensor type. In another embodiment, a second touch module may be configured to detect, at the screen, a touch based on a second touch sensor type, the second touch sensor type being different that the first touch sensor type. In one embodiment, an integration module may be configured to concurrently process input from two or more of the first touch module and the second touch module.

In one embodiment, an apparatus also includes a third touch module configured to detect, at the screen, a touch based on a third touch sensor type. In another embodiment, the third sensor type is different than the first sensor type and the second sensor type. In a further embodiment, the integration module may be configured to concurrently process input from two or more of the first touch module, the second touch module, and the third touch module.

In one embodiment, the apparatus is configured wherein the first touch sensor type is based on one of resistive, capacitive, surface acoustic wave, infrared acrylic projection, optical imaging, dispersive signal technology, magnetic resonance, and acoustic pulse recognition. In another embodiment, the first touch sensor type is based on capacitance, and the second touch sensor type is based on magnetic resonance.

In one embodiment, the integration module is configured to ignore input from the first touch module in response to the first touch module detecting a touch for a threshold period of time. In another embodiment, the integration module is configured to ignore input from the first touch module in response to the first touch module detecting a pre-determined pattern on the screen. In a further embodiment, the apparatus includes a screen pressure module configured to detect a pressure at the screen.

In one embodiment, the screen pressure module is configured to enable the first touch module in response to the pressure exceeding a pressure threshold value, and to disable the first touch module in response to the pressure falling below the pressure threshold value. In another embodiment, the apparatus includes a user interface module configured to receive the pressure threshold value from a user. In a further embodiment, the screen pressure module automatically adjusts the pressure threshold value based on the pressure and one or more inputs from one of the first touch module and the second touch module.

A method is disclosed that includes detecting a pressure at a screen pressure module, enabling a first touch module based on the pressure exceeding a pressure threshold value, and integrating input from a second touch module and the first touch module. In one embodiment, the input from the first touch module and the second touch module are received concurrently.

In another embodiment, the method also includes disabling the first touch module based on the pressure falling below the pressure threshold value. In a further embodiment, the first touch module is based on capacitance and the second touch module is based on magnetic resonance. In one embodiment, the method includes ignoring input from the first touch module in response to the first touch module detecting a pre-determined pattern. In another embodiment, the method includes receiving the pressure threshold value from a user interface module. In a further embodiment, the method includes calculating a pressure threshold value based on a plurality of sensed touches, the sensed touches from one of the first touch module and the second touch module.

In another embodiment, a touch sensor for the first touch module may be selected from the group consisting of resistive sensor, a capacitive sensor, a surface acoustic wave sensor, an infrared acrylic projection sensor, an optical imaging sensor, a dispersive signal sensor, a magnetic resonance sensor, and an acoustic pulse recognition sensor.

A program product is disclosed including a computer readable storage medium storing machine readable code executable by a processor to perform operations. In one embodiment, the operations include receiving a pressure from a screen pressure module. In another embodiment, the operations include enabling a first touch module based on the pressure input from the screen pressure module exceeding a pressure threshold value. In a further embodiment, the operations include integrating input from a second touch module and the first touch module, the input from the first touch module and the second touch module being concurrently received.

In one embodiment, the first touch module is based on capacitance, and the second touch module is based on magnetic resonance. In another embodiment, operations include disabling the first touch module in response to the pressure falling below the pressure threshold value. In a further embodiment, the integrating input further includes integrating input from a third touch module, the input from the third touch module being concurrently received with the input from the first touch module and the second touch module.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
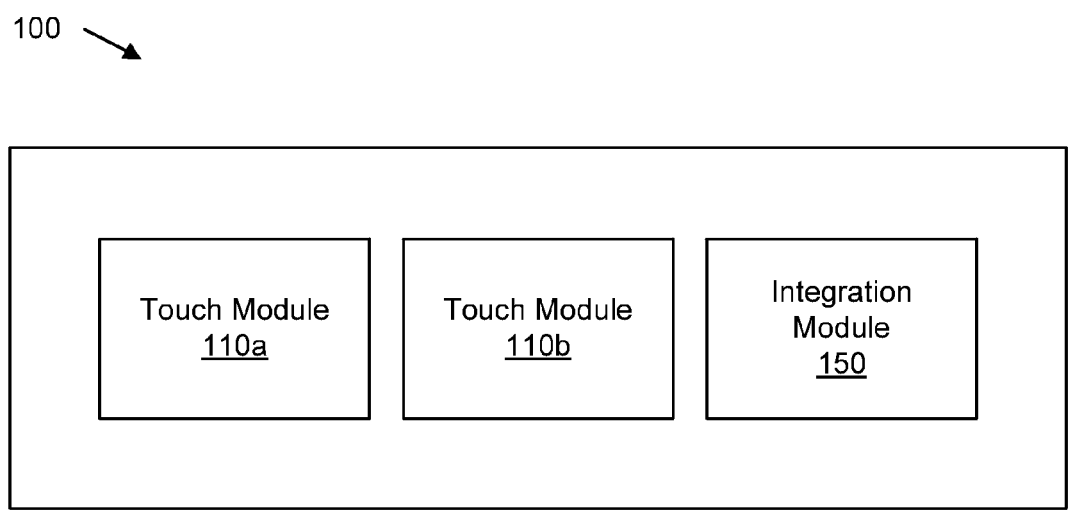
FIG. 1 is a schematic block diagram illustrating one embodiment of a an apparatus for integrating two different touch based inputs.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code. Descriptions of Figures may refer to elements described in previous Figures, like numbers referring to like elements.

In order to address the current state of the art, the present application disclose several embodiments of a method, system, and apparatus for integrating multiple different touch based inputs for a computing device. A computing device may include Computing device at least means a device capable of performing logic operations. A computing device may include a process, memory, display, or the like. For example, a computing device, may be a personal computer, a handheld computer, a mobile device, a cellular phone, a tablet computer, a laptop computer, or other, or the like. A computing device, as described herein, may also include one or more touch based inputs for the screen. A touch based input may include a touch sensor with a module for communicating with the touch sensor. This may allow a user to interface with the computing device, by touching the screen to select buttons, type, input text, draw a line, select icons, execute a program, change a setting, respond to a notification, or the like.

A touch, as described herein, may mean at least interacting with the computing device so as to cause one or more touch sensors to detect a touch. In some embodiment, a touch may include physically contacting a touch sensor of the computing device. For example, a resistive touch sensor may detect a touch after a finger pressed on the resistive touch sensor. In another embodiment, a touch may include coming close to the touch sensor, but not physically contacting the touch sensor. For example, a capacitive touch sensor may detect a touch if a finger comes close enough to the capacitive touch sensor to affect the capacitance of the touch sensor. In another example, a touch sensor that includes a magnetic resonance pen, may detect a disturbance in a magnetic field based on a specialized pen coming close to a magnetic resonance touch sensor. Therefore, a "touch" a described herein, is not limited to any kind of physical contact, and any spatial proximity that affects a touch sensor of any kind may be considered a touch, even if from some distance away from the computing device.

As described herein, a touch sensor may include a variety of different touch technologies. A touch sensor may include resistive technologies such as two electrically-resistive layers separated by a thin space. A touch may be sensed by applying a voltage to one of the layers and detecting a voltage change when a portion of one of the layers comes in contact with the other layer based on the layer being physically moved.

A touch sensor may include surface acoustic wave technologies that may use ultrasonic saves that pass over a screen. A physical object approaching the screen may obstruct or absorb a portion of the ultrasonic wave. A change in the ultrasonic wave may be detected by the touch sensor.

A touch sensor may include capacitive touch technologies such as a panel of glass coated with a transparent conductor. A capacitive touch sensor may detect a distortion of an electrostatic field based on a change in capacitance. A capacitive touch sensor may not detect a touch by a physical object that is an electrical insulator. A capacitive touch sensor may be based on capacitive coupling, surface capacitance, projected capacitance, mutual capacitance, self-capacitance, or the like.

A touch sensor may include an infrared grid using an array of infrared LED's and photodetector pairs on the edges of a screen. A touch sensor may include infrared acrylic projection, optical imaging, dispersive signal technology, acoustic pulse recognition, or the like.

In one embodiment, a touch module may be a module that communicates with a touch sensor. In another embodiment, a touch module may include a touch sensor. In one embodiment, a first touch module may be configured to detect, at a screen, a touch based on a touch sensor type. A touch sensor type may include any of the previously described touch sensors. In another embodiment, a second touch module configured to detect a touch based on a second touch sensor type. In one embodiment, the first touch sensor type may be different than the second touch sensor type. In another embodiment, an apparatus may include an integration module configured to concurrently process input from two or more of the first touch module and the second touch module. Having the benefit of this application, one skilled in the art would be able to make user of both the first touch module and the second touch module simultaneously, or concurrently. In another embodiment, the input from the second touch module and the first touch module may be received concurrently.

FIG. 1 is a schematic block diagram illustrating one embodiment 100 of an apparatus for integrating two different touch based inputs. FIG. 1 discloses a touch module 110a, another touch module 110b, and an integration module 150.

The touch modules 110a,110b may communicate with any of the previously described touch sensors, or touch sensor types. Touch modules 110a,110b may include a touch sensor, or may communicate with a touch sensor. In another embodiment, a touch module 110a may communicate with more than one touch sensor.

An integration module 150 may configured to concurrently process input from one or more touch modules 110a,110b. In one embodiment, an integration module 150 may receive input from one or more touch modules serially, through a communication interface using a wired or a wireless connection. In another embodiment, an integration module 150 may receive input from one or more touch modules 110a,110b in parallel, the integration module 150 having separate interfaces for each touch module 110a,110b. In one embodiment, a touch module 150 may process input from one or more touch modules 110a,110b when the input is received. In another embodiment, the integration module 150 may temporarily store the input in a buffer, and process the input at a later time.

Figure 2:
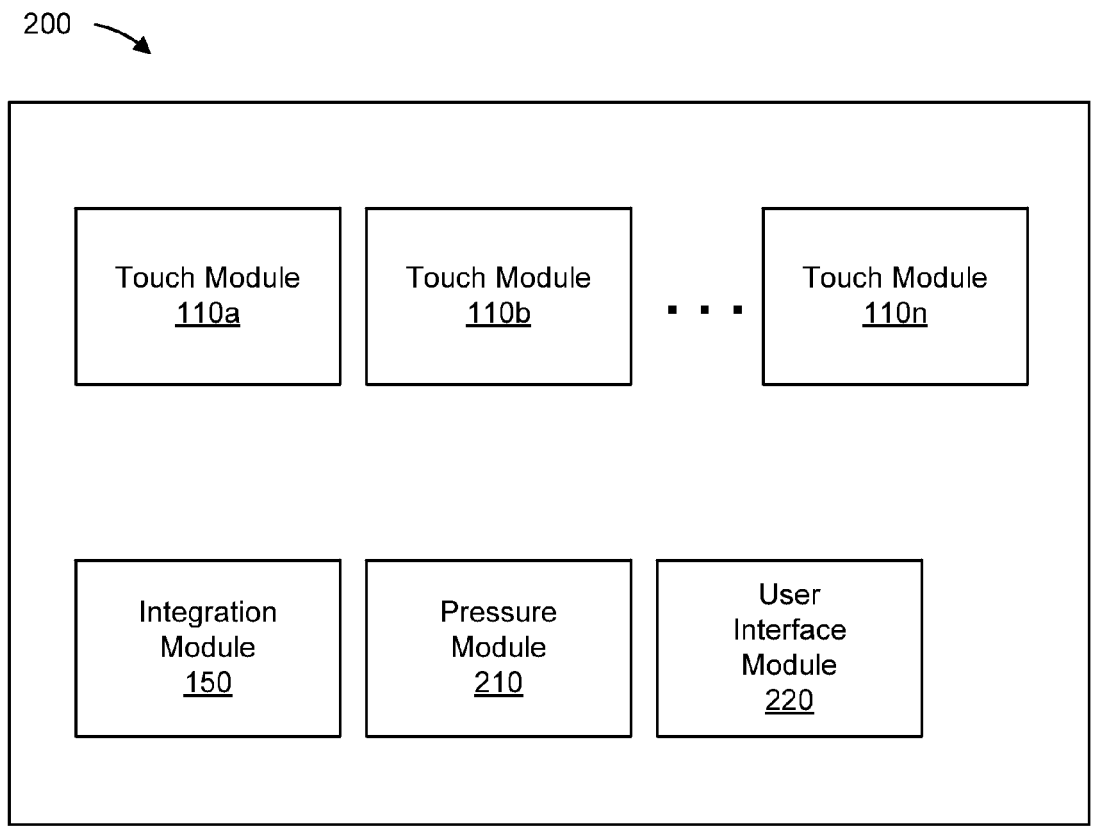
FIG. 2 is another schematic block diagram illustrating one embodiment of an apparatus for integrating multiple different touch based inputs.

FIG. 2 is another schematic block diagram illustrating one embodiment 200 of an apparatus for integrating multiple different touch based inputs. In one embodiment, the apparatus includes many touch modules 110. Touch module 110a may represent a first touch module. Touch module 110b may represent a second touch module. Touch module 110n may represent a third touch module. In another embodiment, touch module 110n may represent a $14^{th}$ touch module. In one embodiment, touch module 110n may represent any other touch module including, but not limited to, the $10^{th}$ touch module, the $100^{th}$ touch module, or more. Therefore, use of the letter 'n' in touch module 110n is not limited to any specific touch module. In one embodiment, an integration module 150 may concurrently process input from the touch module 110a, the touch module 110b, and the touch module 110n, or other touch modules.

In one embodiment, an apparatus may include a pressure module 210. In another embodiment, a pressure module 210 may include a mechanical switch to detect a pressure at a screen. For example, pressure on a screen may collapse or close a mechanical switch to close a circuit that may indicate a threshold pressure has been reached. A pressure threshold may be set based on a spring opposing the mechanical switch.

In one embodiment, a pressure module 210 may include a piezoresistive strain gauge. A strain gauge may be connected to a Wheatstone bridge to maximize the output of the sensor and to reduce sensitivity to errors. In another embodiment, a pressure module 210 may include a diaphragm and pressure cavity to create a variable capacitor to detect strain due to applied pressure. In one embodiment, a pressure module 210 may include an electromagnetic sensor that may measure displacement of a diaphragm by means of measuring changes in inductance. In another embodiment, a pressure module 210 may measure a piezoelectric effect in a material such as, but not limited to, quartz, or the like. In one embodiment, a pressure module 210 may measure a physical change in an optical fiber to measure strain due to an applied pressure. For example, a pressure module 210 may use a Fiber Bragg Grating. In another embodiment, a pressure module may use a potentiometric sensor to detect strain cause by an applied pressure.

In one embodiment, a pressure module 210 may use a quantum tunneling composite that sandwiches a conductive composite layer between touchscreen layers. In another embodiment, a pressure module 210 may use capacitive deflection to indicate pressure. For example, depending on an amount of capacitive deflection, a pressure module 210 may determine that a certain amount of pressure is being applied to a screen. In one embodiment, a pressure module 210 may determine pressure based on a pattern via a resistive touch sensor. For example, a larger touch pattern may indicate that more pressure is applied to a screen, whereas a smaller touch pattern may indicate that less pressure is applied to a screen. Of course, other pressure sensing techniques may be used, as one skilled in the art would appreciate, and this application is not limited in this regard.

In one embodiment, a pressure module 210 may enable or disable one of the touch modules 110 based on a detected pressure at a screen. For example, if a detected screen pressure exceeds a pressure threshold value, a pressure module may enable a touch module 110. In another example, if a detected screen pressure falls below a pressure threshold value, a pressure module 210 may disable a touch module 110. In another embodiment, a pressure module 210 may command an integration module 150 to enable or disable a touch module 110 based, at least in part, on a detected pressure. In one embodiment, a pressure module 210 may receive a pressure threshold value from a user interface module 220.

In one embodiment, an apparatus may include a user interface module 220. A user interface module may display one or more user interfaces via a screen. A user interface may display multiple buttons, controls, windows, or the like, as directed by an operating system, application, or the like, as one skilled in the art may appreciate. In one embodiment, a user interface module may be configured to receive a pressure threshold value from a user.

In one embodiment, an apparatus may include a screen. A screen may include a wide variety of display technologies including, but not limited to, digital light processing, cathode ray tube, liquid crystal, plasma, light emitting diode, organic light emitting diode, or other, or the like, as one skilled in the art may appreciate.

Figure 3:
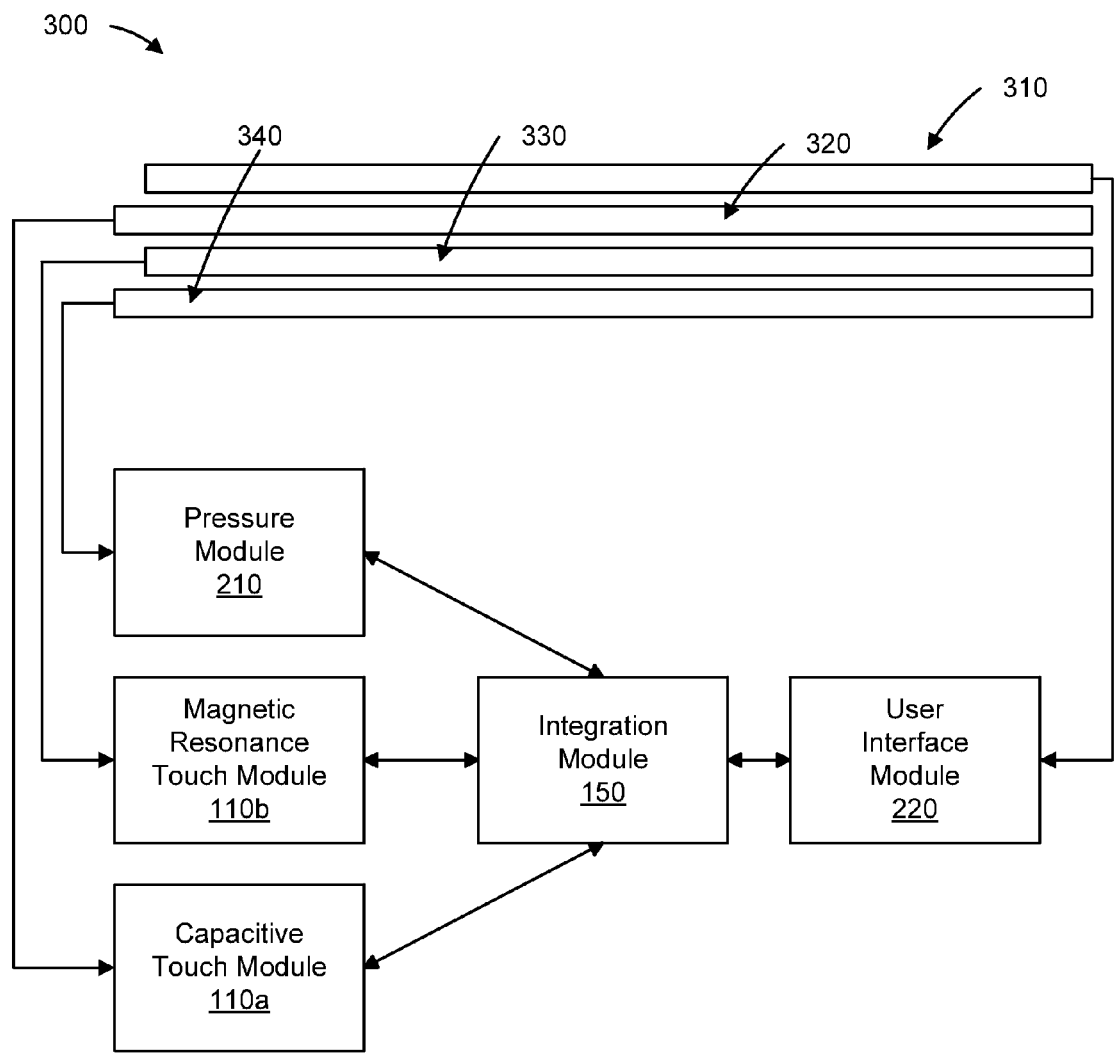
FIG. 3 is a schematic block diagram illustrating one embodiment of a system for integrating two different touch based inputs.

FIG. 3 is a schematic block diagram illustrating one embodiment 300 of a system for integrating two different touch based inputs. One embodiment may include a screen 310, a capacitive touch sensor 320, a magnetic resonance touch sensor 330, and a pressure sensor 340. A pressure module 210 may communicate with the pressure sensor 340. The pressure sensor 340 may be based on any of the previously described pressure sensing technologies regarding a pressure module 210.

In one embodiment, a magnetic resonance touch module 110b may include a touch module 110 for communicating with the magnetic resonance sensor 330. A capacitive touch module 110a may include a touch module 110 for communicating with the capacitive touch sensor 320. In another embodiment, the system 300 may include an integration module 150. An integration module 150 may be configured to concurrently process input from the magnetic resonance touch module 110b and the capacitive touch module 110a. In one embodiment, the integration module 150 may process the input from the magnetic resonance touch module 110b and the capacitive touch module 110a concurrently.

In one embodiment, the capacitive touch module 110 may be initially disabled. A screen pressure module 210 may be configured to enable the capacitive touch module 110a in response to a pressure measured by a screen pressure module 210 exceeding a pressure threshold value. In one embodiment, a pressure threshold value may be received by a user interface module 220.

In another embodiment, a pressure threshold value may be automatically determined by the pressure module 210. For example, a pressure module 210 may record a series of touches, and may distinguish between intended touches by a user, and accidental touches by a user, based on a pattern, a touch time, a touch effect, or the like. For example, accidental touches by a user may be lighter touches at a consistent location on a screen. In this example, a pressure module 210 may learn that a specific pattern of touches are not intentional touches by a user. In one embodiment, a pressure module 210 may determine that a threshold pressure value may be more pressure than an average pressure by a set of unintentional touches. An intentional touch by a user may include a touch of the screen for the computing device wherein the user does not intend the touch to perform some action or function. For example, a user may contact a touch sensor for a touch module when holding or picking up the computing device. This kind of touch may or may not be intended to cause the computing device to perform some function or similar. An intended touch may be a touch by a user that is intended to cause the computing device to perform a function, execute an application, respond to a notification, or interact with the computing device in some other way.

In one embodiment, a pressure module may communicate with another touch module to automatically determine a pressure threshold value based on multiple sensed touches. For example, an integration module 150 may coordinate detected touches by a touch module 110 with touches that resulted in an action by the computing device. A pressure value may be determined associated with touches that resulted in an action by the computing device. Other pressure values may be determined associated with touches that did not result in an action by the computing device. Over time, a statistical analysis of touches, with associated pressure values may result in an average pressure differential between touches that resulted in an action by the computing device and touches that did not. Therefore, a pressure module 150 may automatically determine a pressure threshold value based on many detected touches, or sensed touches.

In another embodiment a pressure module 210 may determine that a computed pressure threshold value may more accurately distinguish between intended touches and unintended touches, compared with a received pressure threshold value. Therefore, a pressure module 210 may automatically adjust the pressure threshold value based on the pressure and one or more inputs from one of the first touch module and the second touch module.

In another embodiment, a pressure module 210 may distinguish between touches on a screen that did not result in an action by the system, and may average pressure values for those touches. In one example, a user interface module 220 may indicate to a pressure module 210 that a recent touch did not result in an action by the system. In one example, a touch was not in the area of a button or other control on the screen. In one embodiment, a pressure module 210 may compute an average pressure by the set of touches that did not result in an action by a user, and determine a pressure threshold value based on the computed average pressures of the touches.

In another embodiment, a touch module 110 may ignore a touch lasting a threshold period of time. For example, a touch may be detected by a touch module 110. If the detected touch remains for more than 10 seconds, a touch module 110 may ignore the touch. In another embodiment, a touch module 110 may periodically check for the existence of the touch, and may continue ignoring the touch as long as it persists. In one example, if the touch ceases, and another touch is detected in the same area, the pressure module 210 may process the input. In one example, a touch sensor may fail resulting in a persistent input regarding a perceived detected touch. A touch module 110 may ignore the persistent touch which may allow a user to continue operating the system 300 notwithstanding the broken touch sensor. Therefore, an integration module 150 may be configured to ignore input from a touch module 110 in response to the touch module 110 detecting a touch for a threshold period of time.

In another embodiment, a touch module 110 may detect a touch at a large portion of the screen. For example, a touch may encompass 20% of the screen or more. In one embodiment, a touch module 110 may ignore a touch that encompasses a large portion of the screen. For example, if an item is set on a screen, a touch sensor may determine that a touch encompasses a large portion of the screen and may ignore the touch. In another example, a cover may be used to protect a screen when the system 300 is not in use. Therefore, a touch module 110 may be configured to ignore a touch when a protective screen is in place. Similarly, a pressure module 210 may ignore pressure input from a pressure sensor when a large portion of the screen is being touched.

In one embodiment, a cover for the screen 310 may be a smart cover. A smart cover, in one embodiment, may include a magnet such that a magnetic sensor at the system 300 may detect the presence of the smart cover. For example, a pressure module 210 may ignore pressure input from a pressure sensor when a smart cover is detected. In another example, a touch module 110 may ignore input from a touch sensor 320,340 when a touch module 110 detects a smart cover.

In one embodiment of a system 300, a capacitive touch sensor may be placed directly underneath and in contact with a screen. In another embodiment, a magnetic resonance touch sensor 330 may be placed under a capacitive touch sensor 320. In one embodiment, a pressure sensor 340 may be placed behind various touch sensors 320,330. In another embodiment, a composite layer may be placed between touchscreen layers, or other, or the like. Of course, other configurations may be used. For example, sensors 320,330 may be placed in different positions behind a screen 310, or in front of a screen 310. In other embodiments, a pressure sensor 340 may be placed between a screen and various sensors 320,330, or the like.

Figure 4:
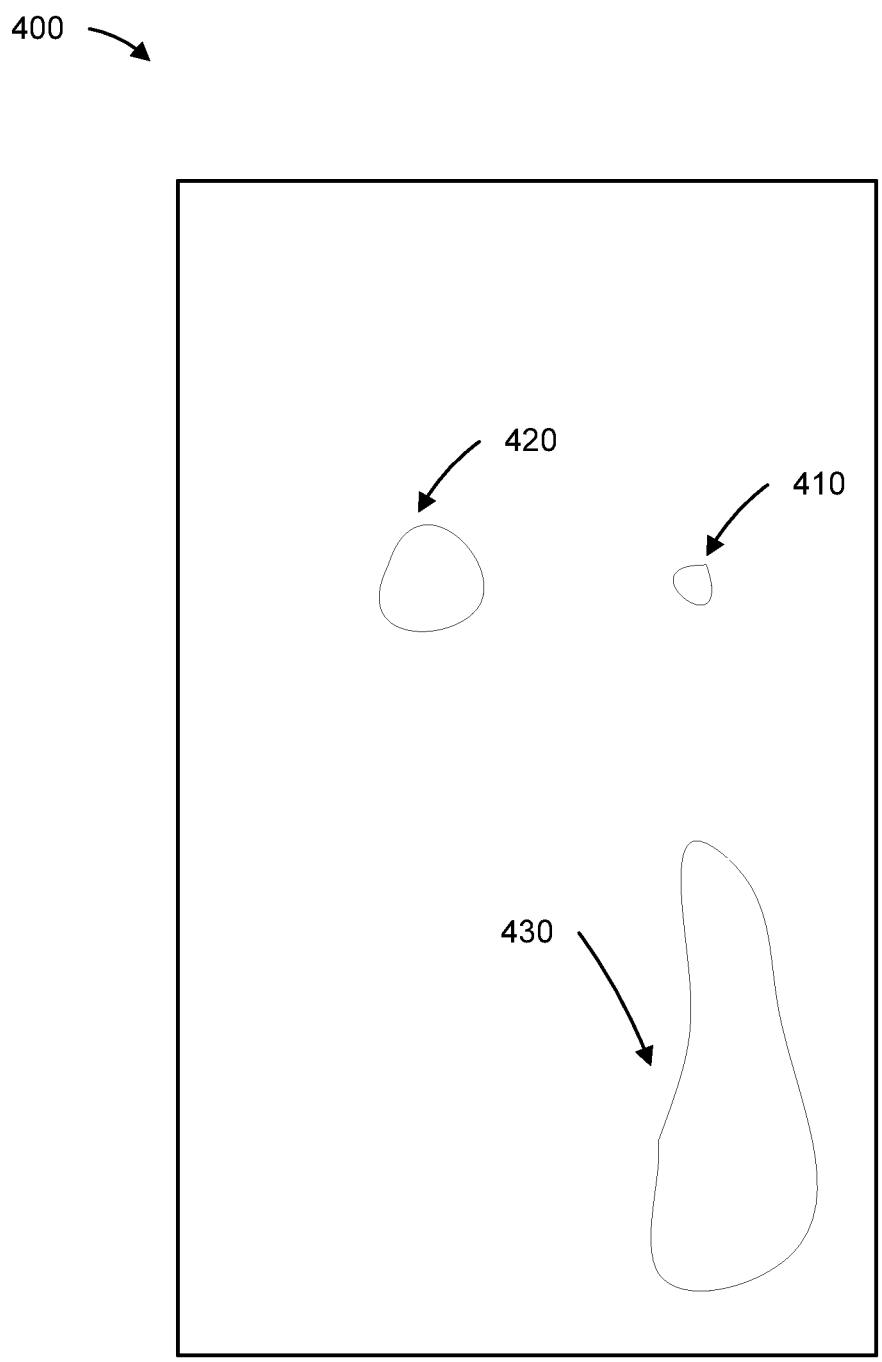
FIG. 4 is an illustration illustrating one embodiment of multiple touches on a touch screen.

FIG. 4 is an illustration illustrating one embodiment 400 of multiple touches on a touch screen. As previously described, a touch sensor may detect a touch at a screen. For example, a touch 420 may be detected by any of the previously described touch sensors. Over time, as previously described, many touches may resemble touch pattern 430. In one embodiment, a touch sensor may determine that the touch 430 may not be an intended touch by a user. In one example, the touch 430 may be a result of a palm rest, or wrist touch (e.g. not a finger or other pointing device). In another embodiment, touch 410 may be a result from a detected touch by a magnetic resonance touch sensor, while touch 420 may be detected by a capacitive touch sensor. Therefore, in one embodiment, a touch module 110a may detect a touch 430, and a touch module 110b may detect a touch 410. An integration module may concurrently process input from touch 430 and 410.

In one embodiment, a capacitive touch sensor 320 may have been disabled by a pressure module 210 because a detected pressure is below a pressure threshold value. Therefore, capacitive touch module 110a communicating with the capacitive touch sensor 320 may not detect a touch 430 at the screen 310. Additionally, a capacitive touch module 110a may not detect a touch 420 at the screen 310, because the touch may be from a finger and the capacitive touch sensor 320 may be disabled.

In another embodiment, in response to touch 420 applying a pressure that exceeds a pressure threshold value, an integration module 150 may enable the capacitive touch module 110a. In one embodiment, the capacitive touch module 110a may then detect touch 420 and may detect touch 430. In another embodiment, as previously described, the capacitive touch module 110a may ignore touch 430 because it may conform to recognized pattern indicating an inadvertent touch, such as, but not limited to, as palm rest, a wrist touch, or the like. Therefore, an integration module 150 may be configured to ignore input from a touch module 110 in response to the touch module 110 detecting a predetermined pattern on the screen.

Figure 5:
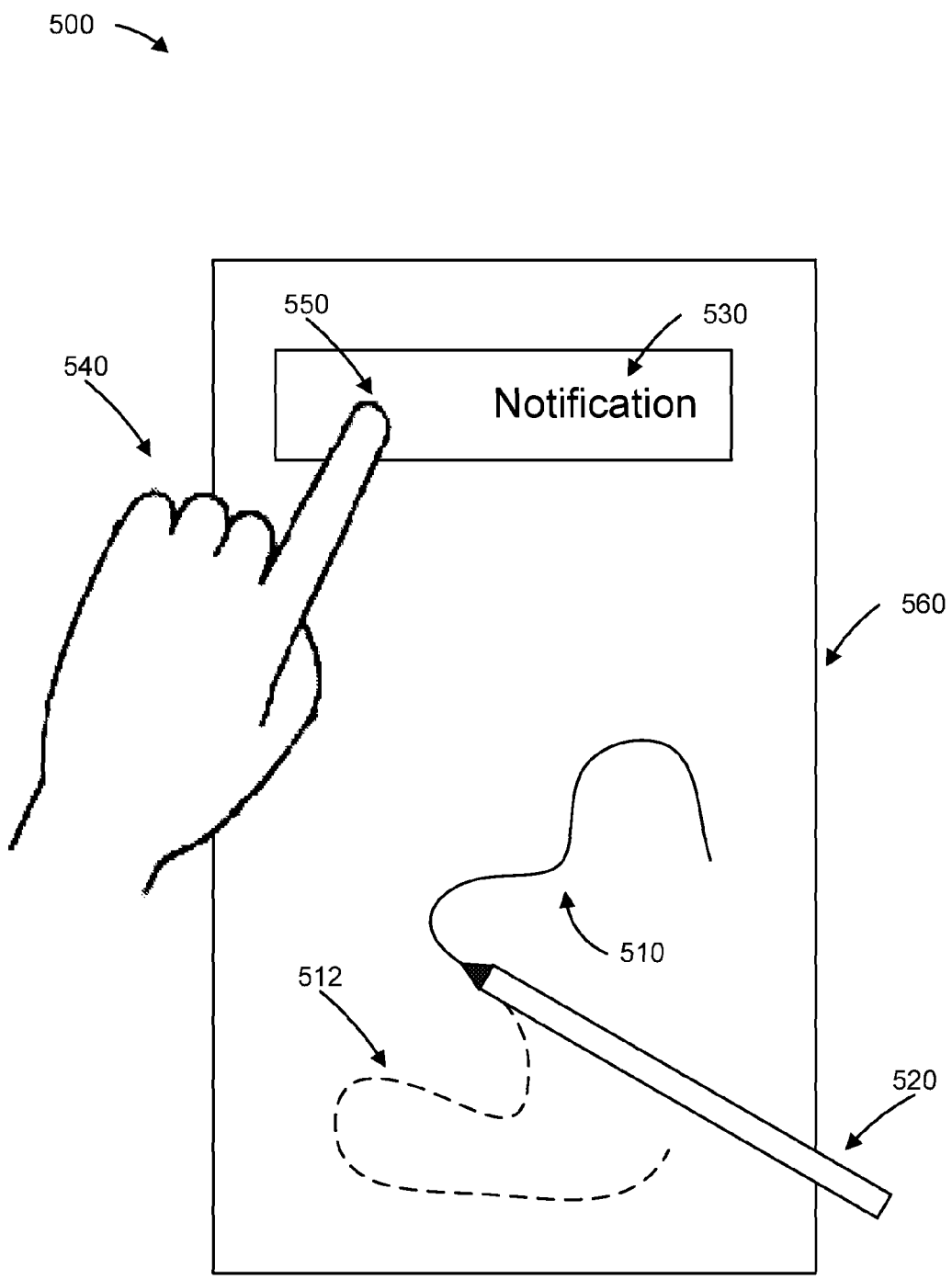
FIG. 5 is an illustration depicting one embodiment of a user interface for a screen implementing multiple touch based inputs.

FIG. 5 is an illustration depicting one embodiment 500 of a computing device with a screen for a screen implementing multiple touch based inputs. In one embodiment, the computing device may include a screen 560, a capacitive touch module 110a and a magnetic resonance touch module 110b. Initially, a capacitive touch module 110a may be disabled. A user may be in the process of drawing a line with a magnetic pen 520 via a magnetic resonance touch module 110b. The line may begin with line 510 and continue to line 512 (not yet completed). While a user is in the process of drawing a line 510,512 a notification 530 may be received by the user interface module 220.

In another embodiment, when a notification is received, a user interface module 220 may display the notification 530 to the user. A user may acknowledge the notification by pressing on the notification 530. Prior to the user pressing on the notification 530, the capacitive touch module may be disabled. In response to a pressure from the user pressing on the notification, the integration module 150 may enable the capacitive touch module 110a. The touch 550 may then be recognized by the capacitive touch module 110a, and the integration module 150 may process input from the capacitive touch module 110a. Because the line drawing occurred via the magnetic resonance touch module 110b, and acknowledging the notification occurred via the capacitive touch module 110a, acknowledging the notification does not necessarily interrupt the line 510,512 being drawn by the user. After the user completes the press to acknowledge the notification 530, the capacitive touch module 110a may be disabled in response to the pressure module 210 detecting that the pressure has fallen below the pressure threshold value. Therefore, in one embodiment, a touch by a wrist or palm as a result of using the magnetic resonance pen may not register as an actual touch if the applied pressure does not exceed a pressure threshold value.

As previously described, a system in one embodiment, may enable one or another touch module 110 in order to acknowledge a touch, and may then disable the touch module 110 after a detected pressure falls below a pressure threshold value. Therefore, a system, in one embodiment, may use pressure to enable or disable one or another touch module 110. Having the benefit of this application, one skilled in the art may be able to enable or disable other touch modules 110 based on varying pressure threshold values. Therefore, in another embodiment, multiple different pressure threshold values may be used to enable or disable multiple different touch modules 110.

Figure 6:
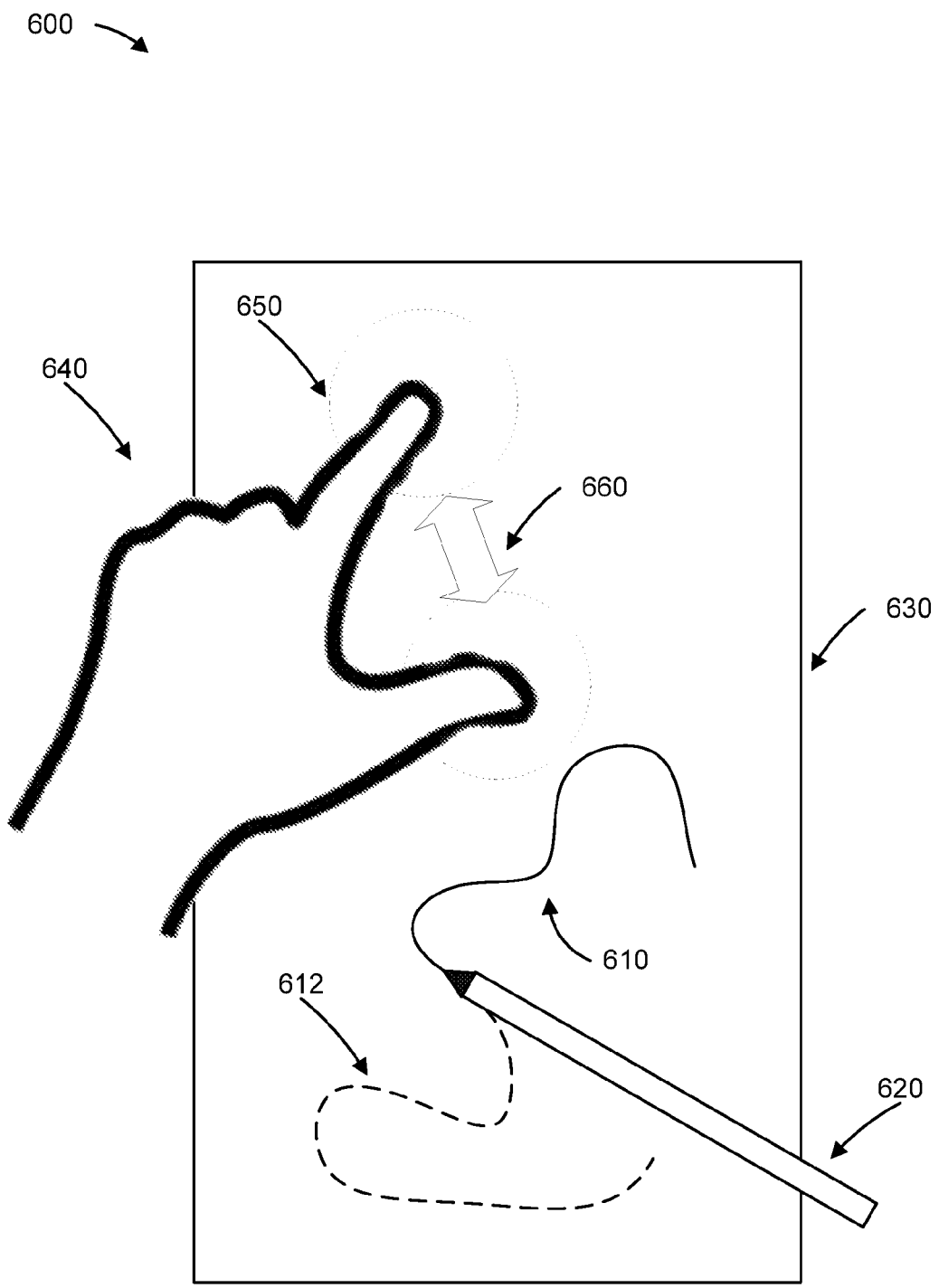
FIG. 6 is another illustration depicting one embodiment of a user interface for a screen implementing multiple different touch based inputs.

FIG. 6 is another illustration depicting one embodiment 600 of a user interface for a computing device implementing multiple different touch based inputs. In one embodiment, a computing device may include a screen 630, a capacitive touch module 110a and a magnetic resonance touch module 110b. Initially, a capacitive touch module 110a may be disabled. A user may be in the process of drawing a line with a magnetic pen 620 via a magnetic resonance touch module 110b. The line may begin with line 610 and continue to line 612 (not yet completed). While a user is in the process of drawing a line 610,612 a user may desire to zoom in a current view.

In one embodiment, a user may begin a zooming action by pressing two fingers 640 on the screen 630 at location 660. Prior to beginning the zooming action, the capacitive touch module 110a may be disabled. In response to a pressure from the user pressing on the screen 630 at location 660 exceeding a pressure threshold value, the integration module 150 may enable the capacitive touch module 110a. The touch 650 may then be recognized by the capacitive touch module 110a, and the integration module 150 may process input from the capacitive touch module 110a. While sufficient pressure is being applied, a user may spread the fingers 640 apart thereby indicating to zoom in.

Because the line drawing is occurring via the magnetic resonance touch module 110b, and the zooming action is occurring via the capacitive touch module 110a, zooming a current view does not necessarily interrupt the user drawing the line 610,612. In other words, an integration module 150 may concurrently process input from both the capacitive touch module 110a and the magnetic resonance module 110b. Therefore, the user may concurrently draw a line and zoom the current view using two different touch modules 110a,110b. After the user completes the press to acknowledge the notification 530, the capacitive touch module 110a may be disabled in response to the pressure module 210 detecting that the pressure has fallen below the pressure threshold value.

Figure 7:
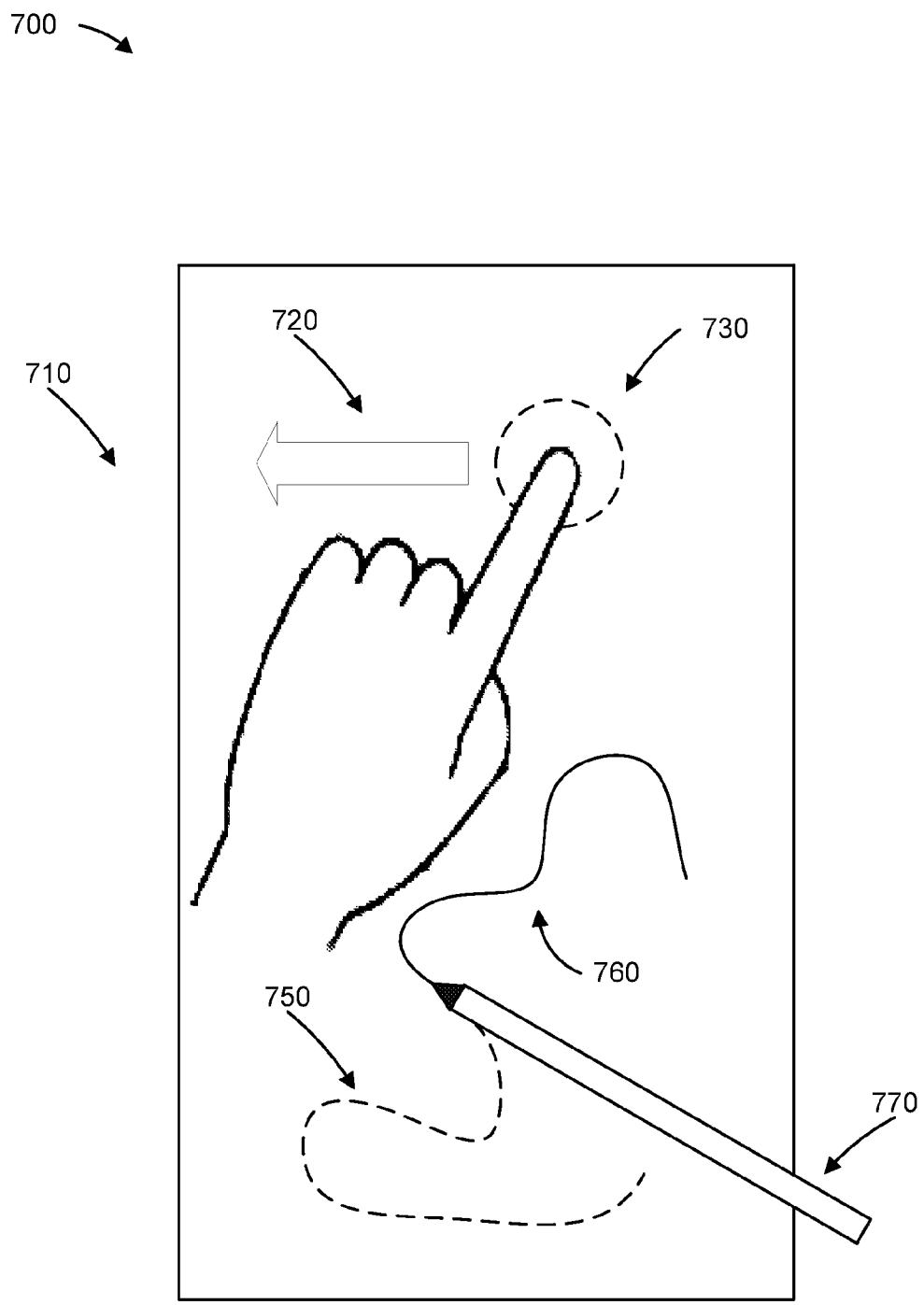
FIG. 7 is another illustration depicting one embodiment of a user interface for a screen implementing multiple different touch based inputs.

FIG. 7 is another illustration depicting one embodiment 700 of a user interface for a computing device including a screen and multiple different touch based inputs. In one embodiment, a computing device may include a screen, a capacitive touch module 110a, and a magnetic resonance touch module 110b. Initially, a capacitive touch module 110a may be disabled. A user may be in the process of drawing a line with a magnetic pen 770 via a magnetic resonance touch module 110b. The line may begin with line 760 and continue to line 750 (not yet completed). While a user is in the process of drawing a line 760,750 a user may desire to pan a current view. As described herein, and as one skilled in the art may recognize, panning may include sliding the current display one direction or another based on a direction of movement of a touch.

In one embodiment, a user may begin a panning action by pressing a finger on the screen at location 730. A pressure applied by the user may exceed a pressure threshold value. Prior to beginning the panning action, the capacitive touch module 110a may be disabled. In response to a pressure from the user pressing on the screen at location 730 exceeding a pressure threshold value, the integration module 150 may enable the capacitive touch module 110a. The touch 720 may then be recognized by the capacitive touch module 110a, and the integration module 150 may process input from the capacitive touch module 110a. While sufficient pressure is being applied, a user may slide in one direction indicating to pan the current display.

Because the line drawing is occurring via the magnetic resonance touch module 110b, in one embodiment, and the panning action is occurring via the capacitive touch module 110a, panning the current view does not necessarily interrupt the user drawing the line 760,750. In other words, an integration module 150 may concurrently process input from both the capacitive touch module 110a and the magnetic resonance module 110b. Therefore, the user may concurrently draw a line and pan the current view using two different touch modules 110a,110b. After the user completes the press to pan the display 710, the capacitive touch module 110a may be disabled in response to the pressure module 210 detecting that the pressure has fallen below the pressure threshold value.

Figure 8:
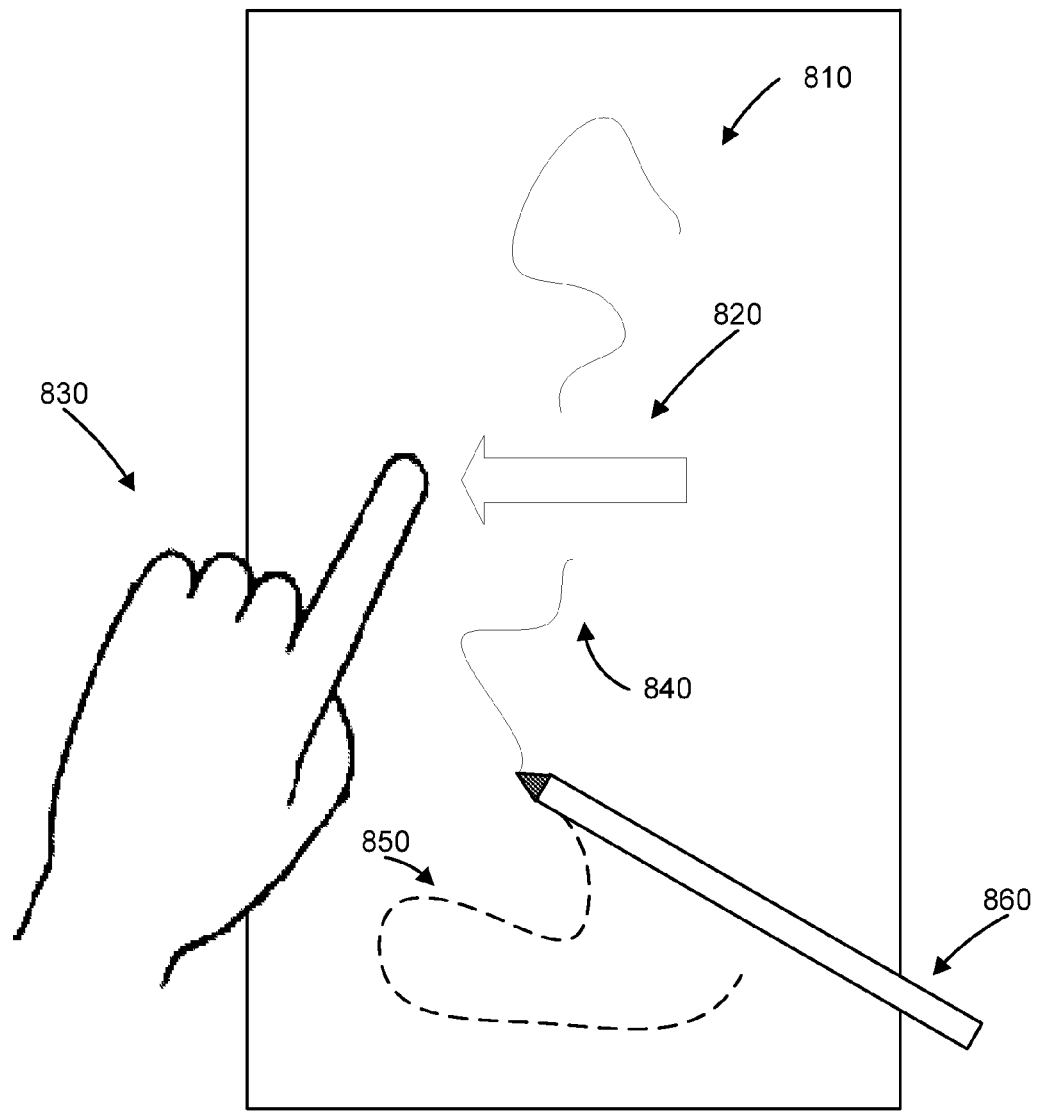
FIG. 8 is another illustration depicting one embodiment of a user interface for a screen implementing multiple different touch based inputs.

FIG. 8 is another illustration depicting one embodiment of a computing device with a screen and multiple different touch based inputs. In one embodiment, a computing device may include a screen, a capacitive touch module 110a and a magnetic resonance touch module 110b. Initially, a capacitive touch module 110a may be disabled. A user may be in the process of drawing a line with a magnetic pen 860 via a magnetic resonance touch module 110b. The line may begin with line 810 and continue to lines 840 and 850 (not yet completed). While a user is in the process of drawing a line 810,840,850 a user may desire to delete a portion of the line, resulting in different lines 810 and 840.

A user may begin an erase action by pressing a finger on the screen at location 820. A pressure applied by the user may exceed a pressure threshold value. Prior to beginning the panning action, the capacitive touch module 110a may be disabled. In response to a pressure from the user pressing on the screen at location 820 exceeding a pressure threshold value, the integration module 150 may enable the capacitive touch module 110a. The touch at location 820 may then be recognized by the capacitive touch module 110a, and the integration module 150 may process input from the capacitive touch module 110a. While sufficient pressure is being applied, a user may slide across the screen to indicate a portion of the line to be erased.

Because the line drawing is occurring via the magnetic resonance touch module 110b, and the erase action is occurring via the capacitive touch module 110a, erasing a portion of the line does not necessarily interrupt the user drawing the line 810,840,850. In other words, an integration module 150 may concurrently process input from both the capacitive touch module 110a and the magnetic resonance module 110b. Therefore, the user may draw a line and erase a portion of the line using two different touch modules 110a,110b concurrently. After the user completes the press to erase a portion of the line, the capacitive touch module 110a may be disabled in response to the pressure module 210 detecting that the pressure has fallen below the pressure threshold value. The user 830 many then continue and finish the line 850.

Figure 9:
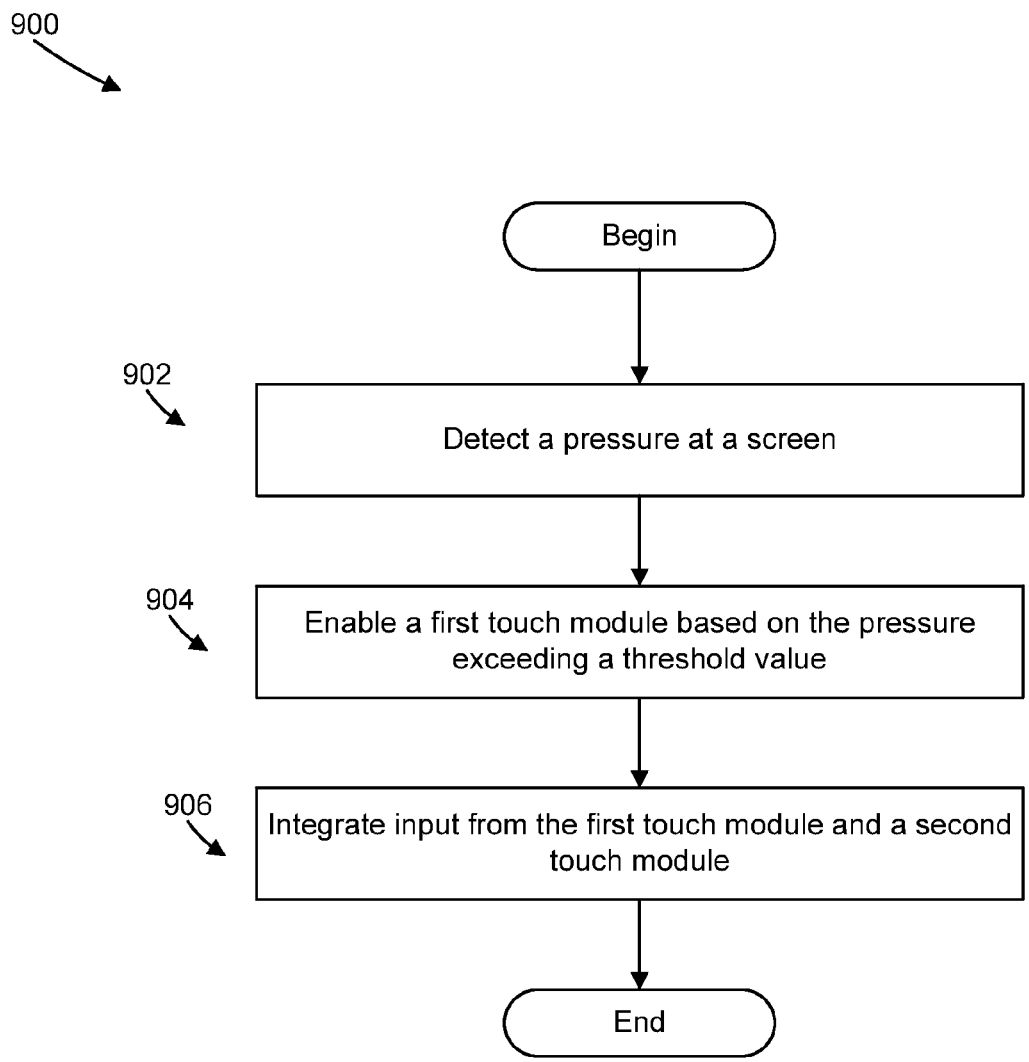
FIG. 9 is schematic flow chart diagram illustrating one embodiment of a method for integrating multiple different touch based inputs.

FIG. 9 is schematic flow chart diagram illustrating one embodiment 900 of a method for integrating multiple different touch based inputs. In one embodiment, the method begins and a pressure module 210 may detect 902 a pressure at a screen. An integration module 150 may enable 904 a first touch module 110a based on the pressure exceeding a pressure threshold value. An integration module 150 may integrate 906 input from the first touch module 110a and a second touch module 110b.

Figure 10:
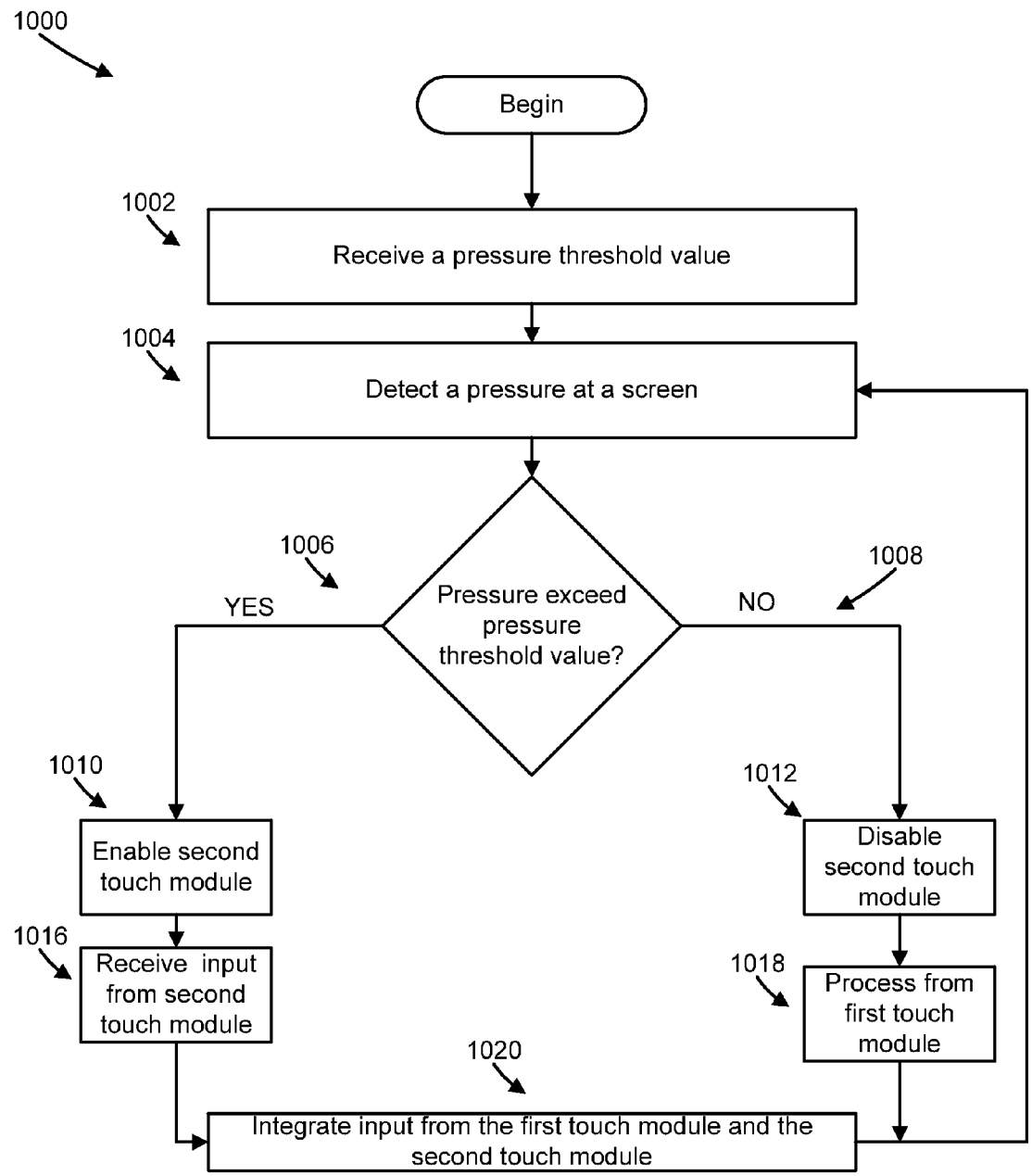
FIG. 10 is another schematic flow chart diagram illustrating one embodiment of a method for integrating multiple different touch based inputs.

FIG. 10 is another schematic flow chart diagram illustrating one embodiment 1000 of a method for integrating multiple different touch based inputs. In one embodiment, the method begins and a user interface module 220 may receive 1002 a pressure threshold value from a user. A pressure module 210 may detect 1004 a pressure at a screen. A pressure module 210 may determine if the detected pressure exceeds the pressure threshold value. If the pressure exceeds 1006 the pressure threshold value, an integration module 150 may enable 1010 a second touch module 110*b*. An integration module 150 may receive input from the second touch module 110*b*, and may integrate 1020 input from the first touch module 110*a* and the second touch module 110*b*. The method may continue with the pressure module 210 detecting another pressure at the screen.

If the detected pressure does not exceed 1008 the pressure threshold value, an integration module 150 may disable 1012 the second touch module 110*b*. The pressure module 150 may then process 1018 input from the first touch module 110*a*. The method may continue with the pressure module 210 detecting another pressure at the screen.

In other embodiments, a designated region on a display may receive capacitive touch based input. For example, while a user may be drawing with a magnetic resonance touch module 110*b*, a user may press down on a predetermined region of the display. A pressure module 210 may detect a pressure value at that region. A pressure module 210 may determine a line width to use for the line being drawn with the magnetic resonance module 110*b* based, at least in part, on the detected pressure at the region. In another embodiment, a pressure module 210 may determine a color to use for the line being drawn with the magnetic resonance module 110*b* based, at least in part, on the detected pressure at the region. In other embodiments, other features of a line may be modified based on a detected pressure by the pressure module 210. Of course, a detected pressure may map to other features, properties, or characteristics of an object being drawn. For example, when drawing a polygon, a detected pressure may affect a solid fill color for the polygon, or other, or the like.

In another embodiment, multiple different areas of a screen may map multiple different characteristics of a drawn object. For example, an upper left region of a screen may be designated as modifying line width, while a lower left region of a screen may be designed as modifying line color. Therefore, a user may modify a line color, or a line width using a capacitive touch module 110*a* while concurrently drawing a line using a magnetic resonance touch module 110*b*. In other embodiments, a user interface module 220 may provide buttons or other controls at different locations on a screen. As described herein, a user may draw using one touch module 110 and perform other actions via another touch module 110.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a screen;
   a first touch module configured to detect, at the screen, a touch from a user's body based on a first touch sensor type;
   a second touch module configured to detect, at the screen, a touch from a pen based on a second touch sensor type, the second touch sensor type being different than the first touch sensor type;
   a screen pressure module configured to detect a pressure at the screen,
      wherein the screen pressure module enables the first touch module in response to the detected pressure exceeding a pressure threshold value, and
      wherein the screen pressure module disables the first touch module in response to the detected pressure being below the pressure threshold value; and
   an integration module configured to concurrently process a first input from the first touch module and a second input from the second touch module, the first input performing a first interaction with a user interface and the second input performing a second interaction with the user interface separate from the first interaction, wherein the first input is used to interact with the user interface independently of the second interaction and without interrupting the second interaction.

2. The apparatus of claim 1, further comprising a third touch module configured to detect, at the screen, a touch based on a third touch sensor type, the third sensor type being different than the first sensor type and the second sensor type, the integration module configured to concurrently process input from two or more of the first touch module, the second touch module, and the third touch module.

3. The apparatus of claim 1, wherein the first touch sensor type is selected from the group consisting of resistive, capacitive, surface acoustic wave, infrared acrylic projection, optical imaging, dispersive signal technology, magnetic resonance, and acoustic pulse recognition.

4. The apparatus of claim 1, wherein the first touch sensor type is based on capacitance, and the second touch sensor type is based on magnetic resonance.

5. The apparatus of claim 4, wherein the integration module is configured to ignore a touch detected by the first touch module in response to the touch lasting a threshold period of time.

6. The apparatus of claim 4, wherein the integration module is configured to ignore a touch detected by the first touch module in response to the touch forming a predetermined pattern on the screen.

7. The apparatus of claim 1, further comprising a user interface module configured to receive the pressure threshold value from a user.

8. The apparatus of claim 1, wherein the screen pressure module automatically adjusts the pressure threshold value based on the pressure and one or more inputs from one of the first touch module and the second touch module.

9. The apparatus of claim 1, wherein the integration module is configured to ignore a touch detected by the first touch module in response to the touch covering more than a predetermined portion of the screen.

10. The apparatus of claim 1, wherein the input from the first touch module used to interact with a user interface comprises input from the first touch module to perform one or a zoom action and a panning action.

11. A method comprising:
   detecting a pressure at a screen via a screen pressure module;
   enabling a first touch module based on the pressure exceeding a pressure threshold value;
   disabling the first touch module based on the pressure falling below the pressure threshold value;
   detecting a touch from a user's body at the screen via the first touch module;
   detecting a touch from a pen at the screen via a second touch module; and
   integrating a first input from the first touch module and a second input from the second touch module, the first input second input being concurrently received, the first input performing a first interaction with a user interface and the second input performing a second interaction with the user interface separate from the first interaction, wherein the first input is used to interact with the user interface independently of the second interaction and without interrupting the second interaction.

12. The method of claim 11, wherein the first touch module is based on capacitance and the second touch module is based on magnetic resonance, the method further comprising ignoring a touch detected by the first touch module in response to the touch forming a pre-determined pattern on the screen.

13. The method of claim 11, further comprising receiving the pressure threshold value from a user interface module.

14. The method of claim 11, further comprising calculating the pressure threshold value based on a plurality of sensed touches, the sensed touches from one of the first touch module and the second touch module.

15. The method of claim 11, wherein the first touch module is based on one of a resistive sensor, a capacitive sensor, a surface acoustic wave sensor, an infrared acrylic projection sensor, an optical imaging sensor, a dispersive signal sensor, a magnetic resonance sensor, and an acoustic pulse recognition sensor.

16. The method of claim 11, wherein integrating input further comprises ignoring a touch detected by the first touch module in response to the touch covering more than a predetermined portion of the screen.

17. A program product comprising a non-transitory computer readable storage medium storing machine readable code executable by a processor to perform:

receiving a pressure at a screen from a screen pressure module;

enabling a first touch module based on the pressure input from the screen pressure module exceeding a pressure threshold value; and disabling the first touch module based on the pressure falling below the pressure threshold value;

detecting a touch from a user's body at the screen via the first touch module;

detecting a touch from a pen at the screen via a second touch module; and integrating a first input from the first touch module and a second input from the second touch module, the first input and the second input being concurrently received, the first input performing a first interaction with a user interface and the second input performing a second interaction with the user interface separate from the first interaction, wherein the second interaction is used to draw one of a line and a shape and wherein the first input is used to interact with the user interface independently of the second interaction and without the second interaction.

18. The program product of claim 17, wherein the first touch module is based on capacitance, and the second touch module is based on magnetic resonance.

19. The program product of claim 17, wherein integrating input further comprises integrating input from a third touch module, the input from the third touch module being concurrently received with the input from the first touch module and the second touch module.

20. The program product of claim 17, wherein integrating input further comprises ignoring a touch detected by the first touch module in response to the touch covering more than a predetermined portion of the screen.

* * * * *